(12) United States Patent
Kachi

(10) Patent No.: US 6,275,952 B1
(45) Date of Patent: Aug. 14, 2001

(54) INFORMATION TRANSMISSION SYSTEM AND INFORMATION TRANSMISSION APPARATUS

(75) Inventor: Seiji Kachi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/459,017

(22) Filed: Dec. 10, 1999

(30) Foreign Application Priority Data

Dec. 10, 1998 (JP) .................................................. 10-351417

(51) Int. Cl.$^7$ ....................................................... G06F 1/04
(52) U.S. Cl. ........................... 713/500; 713/501; 713/600
(58) Field of Search .................................... 713/500, 501, 713/502, 600

(56) References Cited

U.S. PATENT DOCUMENTS

| 5,245,612 | * | 9/1993 | Kachi ................................. | 370/324 |
| 5,473,642 | * | 12/1995 | Osawa et al. ..................... | 375/377 |
| 5,748,891 | * | 5/1998 | Fleming et al. .................... | 375/200 |
| 5,875,321 | * | 2/1999 | Sengoku ............................ | 713/501 |
| 6,052,004 | * | 4/2000 | Saeki ................................. | 327/116 |

FOREIGN PATENT DOCUMENTS

| 1-264412 | 10/1989 | (JP) . |
| 3-96120 | 4/1991 | (JP) . |
| 3-113522 | 5/1991 | (JP) . |
| 4-44416 | 2/1992 | (JP) . |
| 5-341001 | 12/1993 | (JP) . |
| 6-326605 | 11/1994 | (JP) . |
| 9-36923 | 2/1997 | (JP) . |
| 10-150436 | 6/1998 | (JP) . |

* cited by examiner

*Primary Examiner*—Dennis M. Butler
(74) *Attorney, Agent, or Firm*—Scully, Scott, Murphy & Presser

(57) ABSTRACT

In an information transmission system, a first frequency dividing section divides a clock signal by 2X, where X is information to be transmitted, and a second frequency dividing section divides an inverted clock by 2Y, where Y is information to be transmitted. The exclusive-OR of the outputs of the first and second frequency dividing sections is output to a frequency divisor detection section, which measures the time interval between changes thereof at the rising edge of the clock and the falling edge of the clock, thereby reading the set values of the first and second frequency dividing sections via a data signal line.

12 Claims, 5 Drawing Sheets

INFORMATION TRANSMISSION SYSTEM AND INFORMATION TRANSMISSION APPARATUS

BACKGROUND OF THE INVENTION

1. Field of the Invention

The present invention relates to a system and an apparatus used when a CPU reads information such as hardware version information and DIP switch settings that specify a test mode when a piece of equipment is started up, and more particularly to an information transmission system and an apparatus for serially transmitting information using one clock signal line and one data signal line.

2. Background of the Invention

General-purpose field programmable gate arrays (FPGAs) have come into common use as programmable logic devices for use in computers and, while these devices feature the advantage that their operation is controllable by the circuit diagram programmed therewithin, these devices also have the problem in that it is difficult to ascertain what circuit version is operating.

For this reason, version management is an important factor when using these devices.

Although version management is commonly done by applying a physical label in the form of a seal on the device, a more reliable method is to embed the version information in the form of a circuit in the device.

It is therefore desirable that the version information be embedded using as simple a circuit and as few signal lines as possible, this applying as well to the passing of DIP switch information used to specify a test mode.

Because the above-noted type of hardware version information and DIP switch information for specifying a test mode need only be read in one time when the hardware is started up, even if the processing for reading the data is complex and requires some time to perform, it is important that the number of signal lines used be small and that this function be implemented with a simple circuit.

In the past, a common method of passing the above-noted type of information to a CPU was that of a parallel connection to a PIO (process input-output).

Another method was that of start-stop synchronized transmission of the information.

In the above-noted method of parallel connection to a PIO, however, although there is the advantage of a simple circuit configuration, there is the accompanying problem of the large number of signal lines that are required.

For example, to pass just 8 bits of information (values from 0 to 255), it is required to use 8 signal lines.

In the above-noted start-stop synchronization method, although it is only necessary to have a single signal line, the passage of even simple information required a complex circuit.

Another method is that of the electronic equipment mode setting apparatus disclosed in the Japanese Unexamined Patent Publication (KOKAI) No. 3-113522.

The above-noted mode setting apparatus has a frequency divider circuit for forming at least 3 different clocks which correspond to at least 3 different operating modes, a mode setting circuit for selecting and outputting 1 of the clocks formed by the frequency dividing circuit, and a discriminating circuit for discriminating which clock is being output by the mode setting circuit, whereby the output of the discriminating circuit is used to detect the operating mode of the equipment, thereby enabling an inexpensive simple configuration to be used in making settings of multiple modes.

The above-noted disclosure, however, does not solve the problem of achieving data transmission with a single clock, a single data line, and a simple circuit.

Accordingly, it is an object of the present invention to solve the above-noted problem, by providing an information transmission system capable of passing information using a simple circuit and few signal lines.

SUMMARY OF THE INVENTION

In order to achieve the above-noted object, the present invention has the following basic technical constitution.

Specifically, the present invention is a system and an apparatus for serially transmitting information from an information transmission section to an information receiving section, this system being provided with a single clock signal line that connects the information transmission section and the information receiving section, a clock generating section for generating a clock signal sent to said clock signal line, a first frequency dividing section for dividing said clock signal supplied from said clock generation section by a value formed by multiplying said information to be transmitted from said information transmission section to said information receiving section, by even-number, a second frequency dividing section for dividing an inverted clock derived from said clock signal by a value formed by multiplying said information to be transmitted from said information transmission section to said information receiving section, by even-number, a synthesizing section for synthesizing an XOR signal from the output signals from said first and second frequency dividing sections, and a frequency divisor detection section, disposed in said information receiving section, whereby the time interval formed between successive periods at which a level of said output signal output from said signal synthesizing section is changed at the rising edge of the clock signal, is measured, thereby detecting the value set in the first frequency dividing section, and the time interval formed between successive periods at which a level of said output signal output from said signal synthesizing section is changed at the falling edge of the clock signal, is measured, thereby detecting the value set in the second frequency dividing section.

According to the present invention, the first frequency dividing section divides the clock signal by a frequency divisor that is an even-number multiple of the information to be transmitted, the second frequency dividing section divides an inverted clock signal of that clock signal by a frequency divisor that is an odd-number multiple of the information to be transmitted.

The signal synthesizing section synthesizes a signal by taking the exclusive-OR of the output signals from the first and second frequency dividing sections, so that the signal divided by the first frequency dividing section always changes in its signal level at the rising edge of the clock signal and the signal divided by the second frequency dividing section always changes in its signal level at the falling edge of the clock signal.

Therefore, by having the frequency divisor detection section measure the time interval formed between successive period at which a level of the output signal output from the signal synthesizing section is changed at the rising edge of the clock signal, and the time interval formed between successive period at which a level of the output signal output from the signal synthesizing section is changed at the falling edges of the clock signal, it is possible to read, via the data signal line, the values which had been set in the first and second frequency dividing sections.

By doing this, it is possible to pass information via a small number of signal lines, using a simple circuit.

BRIEF DESCRIPTION THE DRAWINGS

DESCRIPTION OF THE PREFERRED EMBODIMENTS

Preferred embodiments of the present invention are described below, with reference being made to relevant accompanying drawings.

Figure 1:
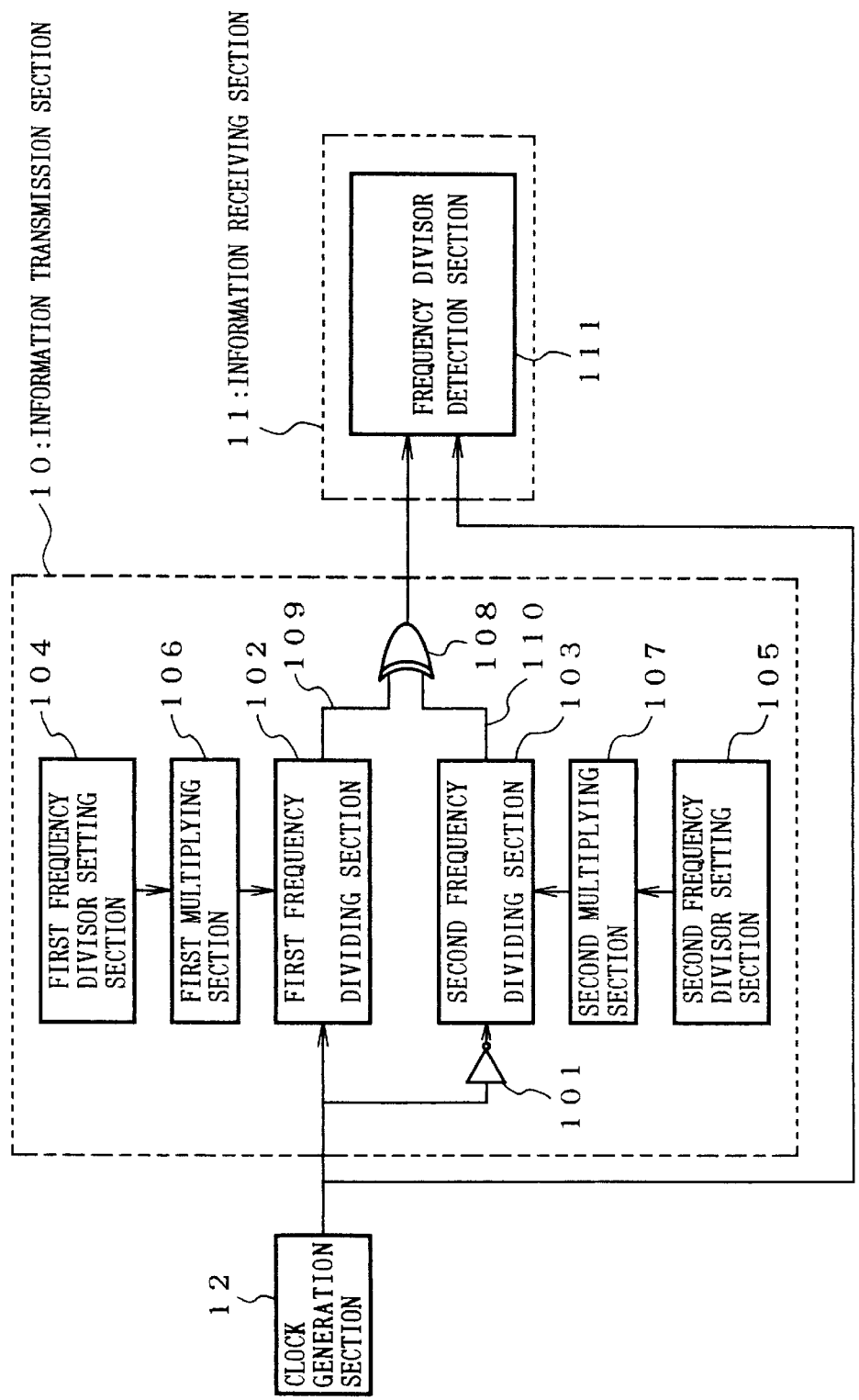
FIG. 1 is a block diagram showing the basic configuration of an information transmission system according to the present invention.

FIG. 1 shows the block diagram of the basic configuration of an information transmission system according to the present invention.

The information transmission system for serially transmitting data using a single clock signal line and a single data signal line shown in FIG. 1, has in information transmission section 10, an information receiving section 11, and a clock generation section 12 for generating a reference clock signal CLK.

The information transmission section 10 has an inverting circuit 101 that inverts the clock signal CLK from the clock generation section 12, a first frequency dividing section 102 which operates at the rising edge of the clock signal CLK from the clock generation section 12 so as to divide the clock signal CLK by an externally set frequency divisor value, a second frequency dividing section 102 which operates at the falling edge of the clock signal CLK from the clock generation section 12 so as to divide the inverted clock signal from the inverting circuit 101 by an externally set frequency divisor value, a first frequency divisor setting section 104 into which is set and stored an arbitrary natural number X, which is information to be transmitted from the information transmission section 10 to the information receiving section 11, a second frequency divisor setting section 105 into which is set and stored an arbitrary natural number Y, which is information to be transmitted from the information transmission section 10 to the information receiving section 11, a first multiplying section 106 that multiplies the frequency divisor X set by the first frequency divisor setting section 104 by 2 so as to derive the frequency divisor of the first frequency dividing section 102, a second multiplying section 107 that multiplies the frequency divisor Y set by the second frequency divisor setting section 105 so as to derive the frequency divisor of the second frequency dividing section 103, and a signal synthesizing section 108 that synthesizing a signal by taking the exclusive-OR of the frequency-divided outputs from the first frequency dividing section 102 and the second frequency dividing section 103.

The information transmission section 11 is formed by a frequency divisor detection section 111.

This frequency divisor detection section 111 measures the time interval formed between successive periods at each of which a signal level of the output signal generated from the signal synthesizing section 108 at the rising edges of the clock signal CLK, so as to detect the value 2X that is set at the first frequency dividing section 102, and measures the time interval formed between successive periods at each of which a signal level of the output signal generated from the signal synthesizing section 108 at the falling edges of the clock signal CLK, so as to detect the value 2Y that is set at the second frequency dividing section 103.

The frequency divisor detection section 111 accepts the input of the clock signal CLK from the clock generation section 12.

In an information transmission system having the configuration described above, in the first frequency dividing section 102 the clock signal CLK from the clock generation section 12 is frequency divided by the frequency divisor 2X that is produced by the first multiplying section 102, which multiplies the frequency divisor X set by the first frequency divisor setting section 104 by 2, and at the second frequency dividing section 103, the inverted clock signal created by inversion of the clock signal CLK by the inverting circuit 107 is frequency divided by the frequency divisor 2Y that is produced by the second multiplying section 106.

The output signal 109 from the first frequency dividing section 102 that is frequency divided by the frequency divisor 2X is input to one input of the signal synthesizing section 108, and the output signal 10 from the second frequency dividing section 103 that is frequency divided by the frequency divisor 2Y is input to the other input of the signal synthesizing section 108.

By doing this, the signal synthesizing section 108 takes the exclusive-OR of the output signals 109 and 110, thereby synthesizing another signal. The exclusive-OR taken by the signal synthesizing section 108 has the following logic.

0+0=0
0+1=1
1+0=1
1+1=0

Because the frequency divisors X and Y that are set for the first and second frequency dividing sections 102 and 103 are each multiplied by 2 by the first and second multiplying sections 106 and 107, respectively, only even frequency divisors are set.

If it is assumed that these frequency dividing sections only operate at the rising edge of the clock signal CLK, if they divide the frequency by an even frequency divider, the signals after frequency division will change at the rising edge of the clock and at the falling edge thereof as well.

Therefore, by observing the two output signals 109 and 111 that are input to the signal synthesizing section 108, the signal 108 divided by the first frequency dividing section 102 always changes on the rising edge of the clock signal CLK.

In contrast to this, because the input to the second frequency dividing section 103 is the inverted clock signal created by the inverting circuit 101, the signal 110 that is divided by the second frequency dividing section 103 always changes at the falling edge of the clock signal CLK.

Therefore, by synthesizing a signal at the signal synthesizing section 108 from these output signals 109 and 110, while the information as to which of the signals is 0 and 1 is lost, the changing point information is preserved.

In the frequency divisor detection section 111, by measuring the interval between changes of the output signal from the signal synthesizing section 108 at the rising edge of the clock signal CLK, it is possible to detect the value 2X set at the first frequency dividing section 102, and by measuring the interval between changes of this signal at the falling edges of the clock signal CLK, it is possible to detect the value 2Y set at the second frequency dividing section 103.

Therefore, according to the information transmission system configured as described above, two items of information that are to be transmitted from the information transmission section 10 to the information receiving section 11 are multiplied by 2 and set as frequency divisors in the first and second frequency dividing sections 102 and 103, the exclusive-OR signal of the output signals of the first and second frequency dividing sections 102 and 103 which divide the frequencies input to them by the doubled frequency divisors being sent to information receiving section 11, at which the frequency divisor detection section 111 thereof measures the interval of changes of the signal at the rising edge of the clock signal CLK and the interval of the changes of the signal at the falling edges of the clock signal CLK, so as to read the two values set at the first and second frequency dividing sections 101 and 102, thereby enabling the receiving at the information using a single clock line and single data line as information transmission signal lines, using a simple circuit configuration.

Next, a specific embodiment of an information transmission system according to the present invention will be described, with reference being made to FIG. 2.

Figure 2:
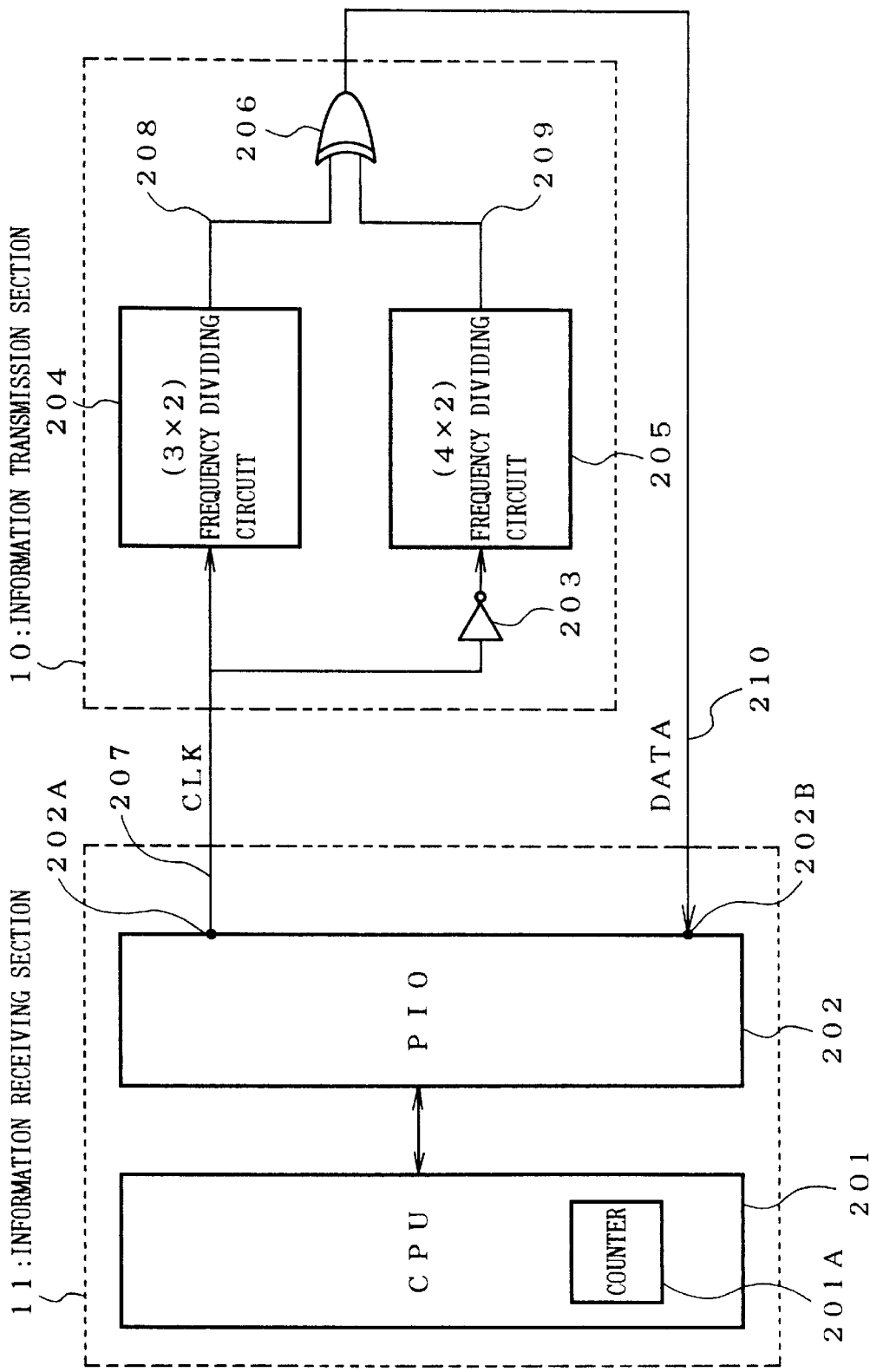
FIG. 2 is a block diagram showing a specific embodiment of an information transmission system according to the present invention.

FIG. 2 shows an embodiment of an information transmission system according to the present invention, in which the information receiving section 11 has a CPU 201 and a PIO section 202 that serves as the external interface of the CPU 201.

The CPU 201 includes a counter 201A, which serves as the frequency divisor detection section shown in FIG. 1 and also serves to measure the time interval of changes at the rising edges of the clock signal CLK and to measure the time interval of changes at the falling edges of the clock signal CLK. The CPU 201 also generates the clock signal CLK by controlling the PIO section 202 with software.

Additionally, the PIO section 202 has an output terminal 202A [W2] for outputting the clock signal CLK, an input terminal 202B for inputting data, the output terminal 202A and the information transmission section 10 being connected by a single clock signal line 207, and the input terminal 202B and the information transmission section 10 being connected by a single data signal line 210.

The information transmission section 11 has a first frequency dividing circuit 204 that operates on the rising edge of the clock signal CLK, a second frequency dividing circuit 205 that operates on the falling edge of the clock signal CLK, an inverting circuit 203 which inverts the clock signal CLK and which applies the resulting inverted clock signal to the input of the second frequency dividing circuit 205, and an exclusive-OR circuit 206 which synthesizes the exclusive-OR of the output signal 208 of the first frequency dividing circuit 204 and the output signal 209 of the second frequency dividing circuit and outputs the resulting signal to the data signal line 210.

The frequency divisor of the first frequency dividing circuit 204 is set to 3×2=6, this frequency divisor 6 being twice the X value of 3. The first frequency dividing circuit 204 represents the first frequency dividing section 102, the first frequency divisor setting section 104, and the first multiplying section 106 shown in FIG. 1.

The frequency divisor of the second frequency dividing circuit 205 is set to 4×2=8, this frequency divisor 8 being twice the Y value of 4. The second frequency dividing circuit 205 represents the second frequency dividing section 103, the second frequency divisor setting section 105, and the second multiplying section 107 shown in FIG. 1.

The operation of an embodiment configured as described above is described below, with reference to FIG. 2 to FIG. 5.

Figure 3:
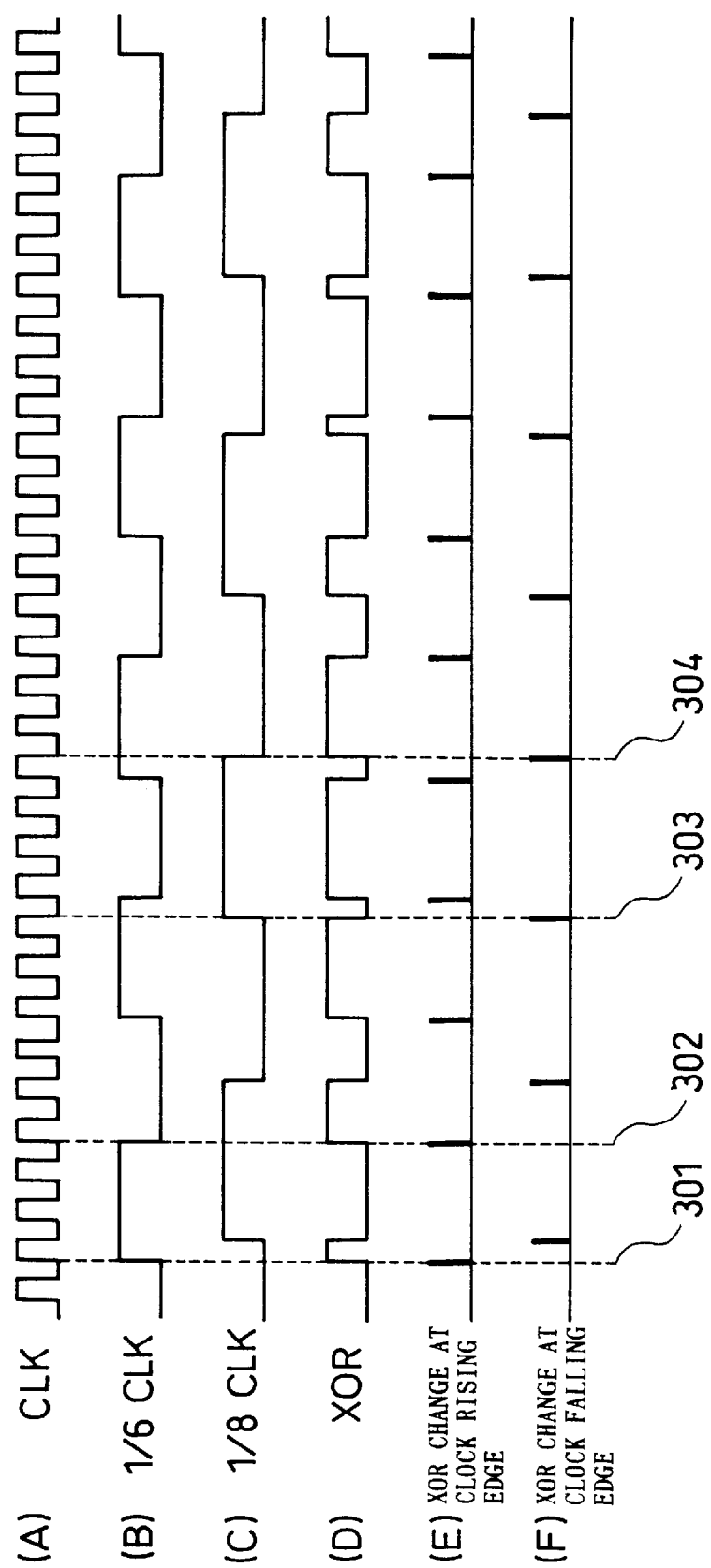
FIG. 3 is a timing diagram showing operation of the embodiment of an information transmission system according to the present invention.

In FIG. 2, the clock signal CLK (refer to FIG. 3 (A)) output from the PIO section 202 of the information receiving section 11 passes via the clock signal line 207 and is input to the first frequency dividing circuit 204, this clock signal CLK being frequency divided by the first frequency dividing circuit 204, which operates on the rising edges of the clock signal CLK, so that an output signal 208, having ⅙ the frequency of the clock signal CLK is output to the exclusive-OR circuit 206, as shown in FIG. 3 (B).

The inverted clock signal created by the inverting circuit 203 is input to the second frequency dividing circuit 205, which operates on the rising edge of the clock signal CLK, thereby dividing the frequency of this inverted clock signal by 8, as shown in FIG. 3 (C), and outputting the ⅛ divided output signal 209 to the exclusive-OR circuit 206.

At the exclusive-OR circuit 206, the exclusive-OR of the output signal 208 and the output signal 209 is synthesized, this exclusive-OR XOR signal, shown in FIG. 3 (D), being then output via the data signal line 210 to the PIO section 202 and then sent to the CPU 201.

It will be understood that the duty cycle of 50% of the clock signal as shown in FIG. 3 does not impose a restriction with regard to clock duty cycle in the present invention.

The operation of the CPU 201 reading the frequency divisor values set at the first and second frequency dividing circuits 204 and 205 from the clock signal CLK and the XOR signal will be described.

First, observing just the rising edges of the clock signal CLK, the set value of the first frequency dividing circuit 204, which operates only at the rising edges of the clock signal CLK, is checked.

In this case, referring to FIG. 3 (E), it will be noted that the XOR signal changes at the rising edge of the clock signal CLK, for example as shown at time 301. If a check is made for a change in the XOR signal at the rising edge of the clock signal CLK after this time 301, this condition is satisfied at the time 302. Therefore, if the number of clock signals CLK between the times 301 and 302 is counted by the counter 201A of the CPU 201, this will be 3, meaning that the time interval between changes of the output of the first frequency dividing circuit 204 is 3 clock pulses.

Because this interval between changes, being the number of clock half-periods, is 3 in this case, this converts to 6 clocks when converted to a full clock period. Therefore, it can be ascertained that the first frequency dividing circuit 204 is dividing the frequency by 6, and that the setting value of the first frequency dividing circuit 204 is therefore 6.

Because the value set at the first frequency dividing circuit 204 is two times the original information to be transmitted, the information that was to be transmitted is ½ of the set value, or 3 in this case.

That is, the number of clocks 3 between the times 301 and 302 is itself the information that was to be transmitted.

Next, a check is made of the setting value at the second frequency dividing circuit 205, which operates at the rising edge of the clock signal CLK. In this case, referring to FIG. 3(F), it will be noted that the XOR signal changes at the falling edge of the clock signal CLK, for examples as shown at time 303. If a check is made for a change in the XOR signal at the falling edge of the clock signal CLK after this time 303, this condition is satisfied at the time 304.

Therefore, the number of clocks between the time 303 and the time 304 is 4, meaning that the time interval between changes of the output of the second frequency dividing circuit 205 is 4 clock pulses.

Because this interval between changes, being the number of clock half-periods, is 4 in this case, this converts to 8 clocks when converted to a full clock period. Therefore, it can be ascertained that the second frequency dividing circuit 205 is dividing the frequency by 8, and that the setting value of the second frequency dividing circuit 205 is therefore 8.

Because the value set at the second frequency dividing circuit 205 is two times the original information to be transmitted, the information that was to be transmitted is ½ of the set value, or 4 in this case. That is, the number of clocks 4 between the times 303 and 304 is itself the information that was to be transmitted.

Figure 4:
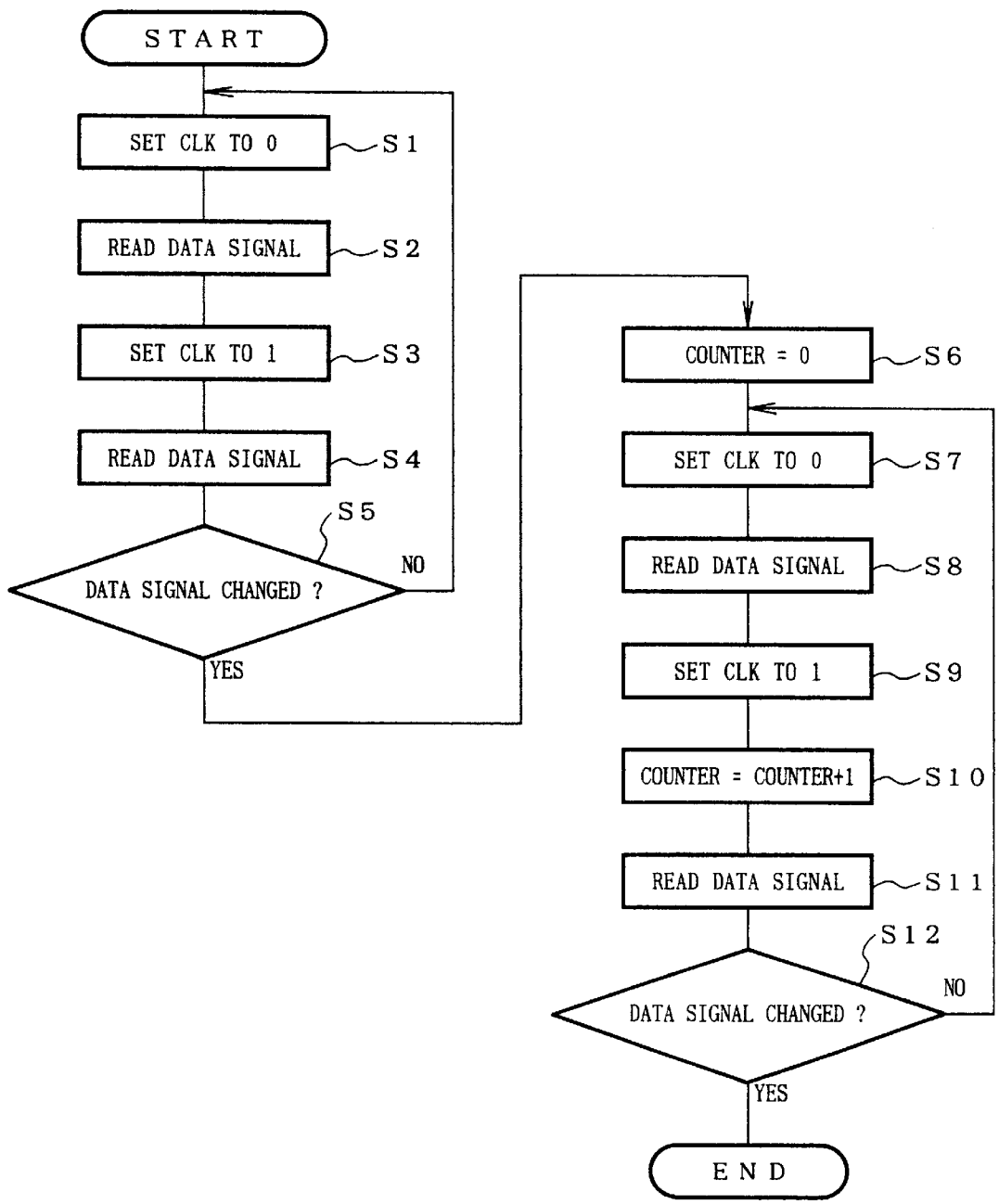
FIG. 4 is a flowchart showing the operation occurring in the embodiment of the information transmission system according to the present invention when value of the first frequency dividing section is read.
Figure 5:
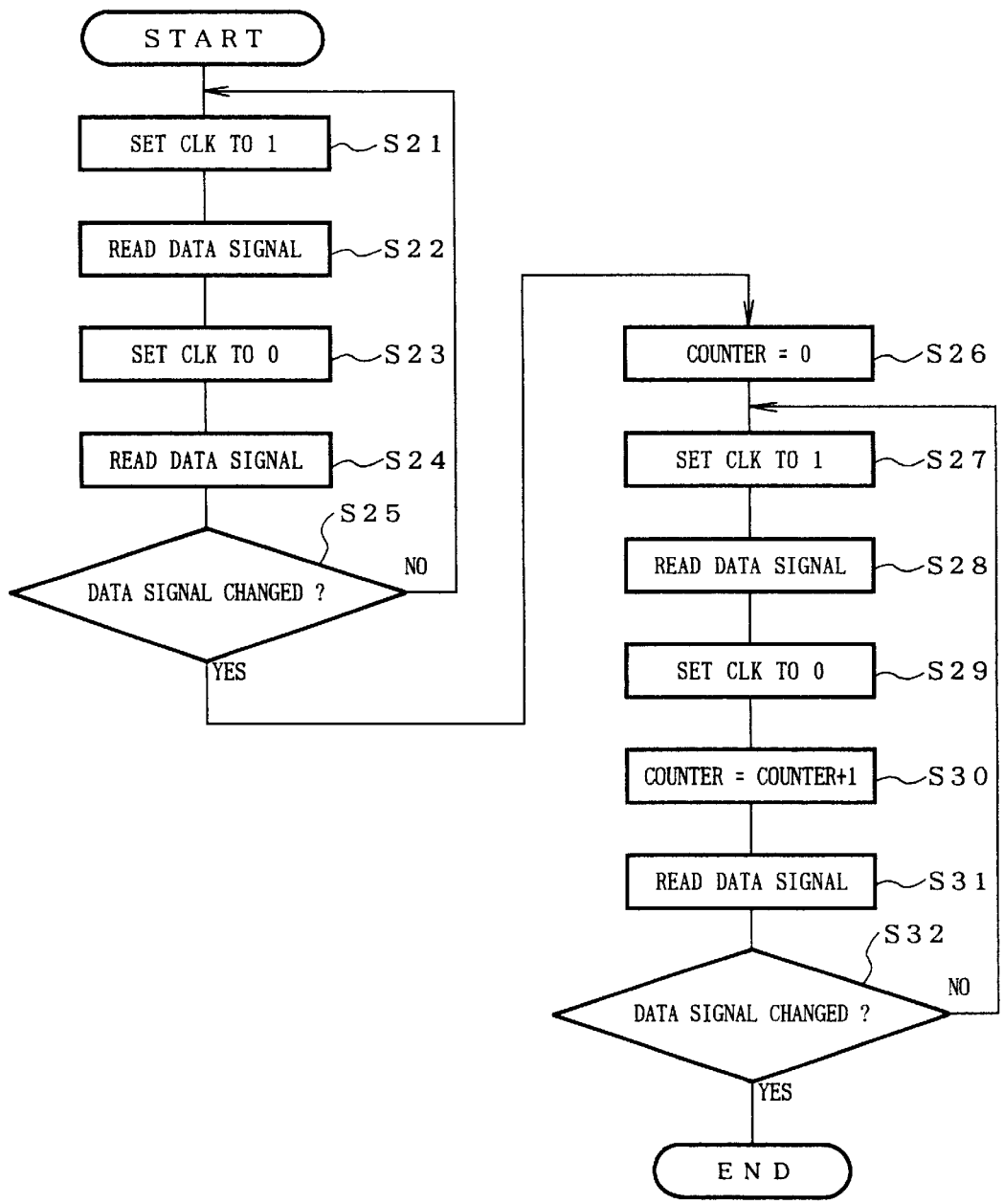
FIG. 5 is a flowchart showing the operation occurring in the embodiment of the information transmission system according to the present invention when value of the first frequency dividing section is read.

FIG. 4 and FIG. 5 shows flowcharts that illustrate the processing in the above-noted reading operations. FIG. 4 shows the operation of reading the value of the first frequency dividing circuit 204, which operates at the rising edge of the clock signal CLK, and FIG. 5 shows the operation of reading the value of the second frequency dividing circuit 205, which operates at the falling edge of the clock signal CLK.

As shown in FIG. 4, when the operation of reading the setting value of the first frequency dividing circuit 204 is started by the CPU 201, processing to search for a change in the XOR signal at the rising edge of the clock signal CLK is executed.

Specifically, to check for the rising edge of the clock signal CLK, the clock signal CLK is first made 0 (step S1). Next, the data signal being sent to the information receiving section 11 from the information transmission section 10 at this point is read (step S2). After this point, the clock signal CLK is made 1 (step S3), and the data being sent to the information receiving section 11 at that point is read (step S4). Next, a judgment is made as to whether or not the data signal had changed (step S5).

At this point, if the judgment was that the data signal had not changed, return is made to step S1, and the processing of steps S1 through S5 is repeated, so as to search for a point at which the XOR signal changes at a rising edge of the clock signal CLK. If, however, the judgment was made that the data signal had changed, processing proceeds to step S6, at which the contents of the counter 201A are initialized to 0.

Next, the clock signal CLK is set to 0 (step S7). Then, the data signal being sent at this point from the information transmission section 10 to the information receiving section 11 is read (step S8), and the clock signal CLK is set to 1 (step S9).

After this, the value of the counter 201A is incremented by 1 (step S10), and data is read again (step S12), to search for a point at which the next data signal change at a rising edge of the clock signal CLK occurs, by making a judgment as to whether the read data signal had changed (step S12).

If a judgment is made that the data signal had not changed, return is made to step S7, and the processing of steps S7 through S12 is repeated until the point at which the data signal again changes is found, the counter 201A being incremented each time this processing is repeated.

This count value of the counter 201A represents the value of the first frequency dividing circuit 204, which operates on the rising edge of the clock signal CLK, and is also the information that is transmitted from the information transmission section 10 to the information receiving section 11.

The operation of reading the value of the second frequency dividing circuit 205, which operates on the falling edge of the clock signal CLK is described below, with reference to FIG. 5.

As shown in FIG. 5, when the operation of reading the setting value of the second frequency dividing circuit 205 is started by the CPU 201, processing to search for a change in the XOR signal at the rising edge of the clock signal CLK is executed.

Specifically, to check for the falling edge of the clock signal CLK, the clock signal CLK is first made 1 (step S21). Next, the data signal being sent to the information receiving section 11 from the information transmission section 10 at this point is read (step S22).

After this point, the clock signal CLK is made 0 (step S23), and the data being sent to the information receiving section 11 at that point is read (step S24). Next, a judgment is made as to whether or not the data signal had changed (step S25).

At this point, if the judgment was that the data signal had not changed, return is made to step S21, and the processing of steps S21 through S25 is repeated, so as to search for a point at which the XOR signal changes at a falling edge of the clock signal CLK. If, however, the judgment was made that the data signal had changed, processing proceeds to step S26, at which the contents of the counter 201A are initialized to 0.

Next, the clock signal CLK is set to 1 (step S27). Then, the data signal being sent at this point from the information transmission section 10 to the information receiving section 11 is read (step S28), and the clock signal CLK is set to 0 (step S9).

After this, the value of the counter 201A is incremented by 1 (step S30), and data is read again (step S31), to search for a point at which the next data signal change at a rising edge of the clock signal CLK occurs, by making a judgment as to whether the read data signal had changed (step S32).

If a judgment is made that the data signal had not changed, return is made to step S27, and the processing of steps S27 through S32 is repeated until the point at which the data signal again changes is found, the counter 201A being incremented each time this processing is repeated.

This count value of the counter 201A represents the value of the second frequency dividing circuit 205, which operates on the falling edge of the clock signal CLK, and is also the information that is transmitted from the information transmission section 10 to the information receiving section 11.

According to an information transmission system configured as described in detail above, information to be transmitted from an information transmission section to an information receiving section are set as the frequency divisors in the first and second frequency dividing sections, an XOR signal synthesized as the exclusive-OR of the outputs of these frequency dividing sections being sent to the information receiving section, at which a frequency divisor detection section measures the interval between changes in this signal at rising edges of the clock signal and the interval between changes in this signal at falling edges of the clock signal, so as to read the values set at the first and second frequency dividing sections.

This approach reduces the number of signal lines required to transmit the information to just a single clock line and a single data line, and enables a simple circuit to be used for the data transmission. The present invention is particularly suited to application of the reading of hardware version information and DIP switch settings of test modes.

What is claimed is:

1. An information transmission system comprising:
   an information transmission section; and
   an information receiving section;
   whereby information can be serially transmitted from said information transmission section to said information receiving section;
   said system further comprising;
   a single clock signal line connecting said information transmission section and said information receiving section;
   a clock generating section for generating a clock signal sent to said clock signal line;
   a first frequency dividing section for dividing said clock signal supplied from said clock generation section by a value formed by multiplying said information to be transmitted from said information transmission section to said information receiving section, by even-number;
   a second frequency dividing section for dividing an inverted clock derived from said clock signal by a value formed by multiplying said information to be transmitted from said information transmission section to said information receiving section, by even-number;
   a synthesizing section for synthesizing an XOR signal from the output signals from said first and second frequency dividing sections; and
   a frequency divisor detection section, disposed in said information receiving section, whereby the time interval formed between successive periods at which a level of said output signal output from said signal synthesizing section is changed at the rising edge of the clock signal, is measured, thereby detecting the value set in the first frequency dividing section, and the time interval formed between successive periods at which a level of said output signal output from said signal synthesizing section is changed at the falling edge of the clock signal, is measured, thereby detecting the value set in the second frequency dividing section.

2. An information transmission system according to claim 1, wherein transmission of information from said information transmission section to said information receiving section is performed by a single data signal line connecting said information transmission section and said information receiving section.

3. An information transmission system according to claim 1, wherein said first frequency dividing section comprises a frequency divisor setting section for setting said information to be transmitted from said information transmission section to said information receiving section as a frequency divisor, and a multiplying section for multiplying the frequency divisor set by said frequency divisor setting section by two, so as to establish said resulted frequency divisor as the frequency divisor of said first frequency dividing section.

4. An information transmission system according to claim 1, wherein said second frequency dividing section comprises a frequency divisor setting section for setting said information to be transmitted from said information transmission section to said information receiving section as a frequency divisor, and a multiplying section for multiplying the frequency divisor set by said frequency divisor setting section by two, so as to establish said resulted frequency divisor as the frequency divisor of said first frequency dividing section.

5. An information transmission system according to claim 1, wherein said signal synthesizing section is an exclusive-OR circuit.

6. An information transmission system according to claim 1, wherein said information receiving section comprises a CPU and a PIO section serving as an external interface of said CPU, said CPU serving as said frequency divisor detection section and provided with a counter to measure either the time interval of successive period at each of which a level of said output signal output from said signal synthesizing section is changed at the rising edge of the clock signal or the time interval of successive period at each of which a level of said output signal output from said signal synthesizing section is changed at the falling edge of the clock signal, and said CPU also controlling said PIO section by means of software, so as to generate said clock signal.

7. An information transmission system according to claim 1, wherein said value of said frequency divisor as set in said first frequency dividing section is different from that of said frequency divisor as set in said second frequency dividing section.

8. An information transmission apparatus which is used for transmitting information from an information transmission section and an information receiving section; said apparatus comprising:
   an information transmission section;
   an information receiving section;
   a single clock signal line connecting said information transmission section and said information receiving section; and
   a clock generating section for generating a clock signal sent to said clock signal line, and wherein said information transmission section being further provided with;
   a first frequency dividing section for dividing said clock signal supplied from said clock generation section by a value formed by multiplying said information to be transmitted from said information transmission section to said information receiving section, by even-number;
   a second frequency dividing section for dividing an inverted clock derived from said clock signal by a value formed by multiplying said information to be transmitted from said information transmission section to said information receiving section, by even-number;
   a synthesizing section for synthesizing an XOR signal from the output signals from said first and second frequency dividing sections; and wherein said information receiving section being further provided with;
   a frequency divisor detection section, whereby the time interval formed between successive periods at which a level of said output signal output from said signal synthesizing section is changed at the rising edge of the clock signal, is measured, thereby detecting the value set in the first frequency dividing section, and the time interval formed between successive periods at which a level of said output signal output from said signal synthesizing section is changed at the falling edge of the clock signal, is measured, thereby detecting the value set in the second frequency dividing section.

9. An information transmission apparatus according to claim 8, wherein transmission of information from said information transmission section to said information receiving section is performed by a single data signal line connecting said information transmission section and said information receiving section.

10. An information transmission apparatus according to claim 8, wherein said first frequency dividing section comprises a frequency divisor setting section for setting said information to be transmitted from said information transmission section to said information receiving section as a frequency divisor, and a multiplying section for multiplying the frequency divisor set by said frequency divisor setting section by two.

11. An information transmission apparatus according to claim 8, wherein said second frequency dividing section comprises a frequency divisor setting section for setting said information to be transmitted from said information transmission section to said information receiving section as a frequency divisor, and a multiplying section for multiplying the frequency divisor set by said frequency divisor setting section by two.

12. An information transmission apparatus according to claim 8, wherein said signal synthesizing section is an exclusive-OR circuit.

* * * * *